(12) United States Patent
Kahng et al.

(10) Patent No.: US 10,713,406 B2
(45) Date of Patent: Jul. 14, 2020

(54) MULTI-DIE IC LAYOUT METHODS WITH AWARENESS OF MIX AND MATCH DIE INTEGRATION

(71) Applicant: The Regents of the University of California, Oakland, CA (US)

(72) Inventors: Andrew B. Kahng, Del Mar, CA (US); Kwangsoo Han, La Jolla, CA (US); Jiajia Li, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 99 days.

(21) Appl. No.: 15/778,786

(22) PCT Filed: Nov. 29, 2016

(86) PCT No.: PCT/US2016/064007
§ 371 (c)(1),
(2) Date: May 24, 2018

(87) PCT Pub. No.: WO2017/095811
PCT Pub. Date: Jun. 8, 2017

(65) Prior Publication Data
US 2018/0341738 A1    Nov. 29, 2018

Related U.S. Application Data

(60) Provisional application No. 62/261,261, filed on Nov. 30, 2015.

(51) Int. Cl.
*G06F 17/50* (2006.01)
*G06F 30/392* (2020.01)
(Continued)

(52) U.S. Cl.
CPC .......... *G06F 30/392* (2020.01); *G06F 30/327* (2020.01); *G06F 30/337* (2020.01);
(Continued)

(58) Field of Classification Search
None
See application file for complete search history.

(56) References Cited

U.S. PATENT DOCUMENTS 7,565,635 B2 * 7/2009 Chao .................... G06F 17/5045
716/106
8,010,916 B2 * 8/2011 Bickford ............. G06F 17/5081
716/56

(Continued)

OTHER PUBLICATIONS

C.M. Fiduccia et al., "A Linear-Time Heuristic for Improving Network Partitions," 19th Design Automation Conference, 1982 IEEE, pp. 175-181. (Year: 1982).*

(Continued)

*Primary Examiner* — Leigh M Garbowski
(74) *Attorney, Agent, or Firm* — Greer, Burns & Crain, Ltd.; Steven P. Fallon

(57) ABSTRACT

A method for optimizing a multi die implementation flow that is aware of mix-and-match die integration for implementing multi-die integrated circuits includes partitioning a netlist into partitions comprehending mix-and-match die integration, wherein each partition will be assigned to a die. Each partition is placed into a corresponding die. A clock tree of the integrated circuit is synthesized. Nets of the integrated circuit in are routed in accordance the placing and synthesizing.

16 Claims, 9 Drawing Sheets

```
Clustering.
1:  cell_list ← sort all cells in increasing order of their slacks
2:  for all c ∈ cell_list that is not clustered do
3:      queue.push_from(c); u ← ∅ // initialize cluster u
4:      while |u| < N_ub do
5:          s' ← −∞; c' ← ∅; queue' ← ∅
6:          while |queue| > 0 do
7:              c ← queue.pop_from()
8:              s_u ← slack(u); s_c ← slack(c)
9:              move c to a different tier; incremental timing analysis
10:             if |u| == 0 || slack(u) ≥ s_u && slack(c) ≥ s_c then
11:                 u ← u ∪ {c}
12:                 if |u| ≥ N_ub then
13:                     break
14:                 end if
15:                 queue.push_back(neighbors of c that are not clustered)
16:             else
17:                 if min(slack(c),slack(u)) > s' then
18:                     s' ← min(slack(c),slack(u)); c' ← c
19:                 end if
20:                 queue'.push_back(c)
21:                 recover c to its original tier; incremental timing analysis
22:             end if
23:         end while
24:         if |u| ≥ N_ub || |queue'| == 0 then
25:             break
26:         end if
27:         move c' to a different tier; incremental timing analysis
28:         u ← u ∪ {c'}
29:         queue.push_back(neighbors of c' that is not clustered)
30:         queue.push_back(queue'); queue' ← ∅
31:     end while
32: end for
```

(51) Int. Cl.

| | |
|---|---|
| *G06F 30/394* | (2020.01) |
| *G06F 30/39* | (2020.01) |
| *G06F 30/327* | (2020.01) |
| *G06F 30/3312* | (2020.01) |
| *G06F 30/337* | (2020.01) |
| *G06F 30/398* | (2020.01) |
| G06F 30/396 | (2020.01) |
| G06F 119/12 | (2020.01) |

(52) U.S. Cl.
CPC .......... *G06F 30/3312* (2020.01); *G06F 30/39* (2020.01); *G06F 30/394* (2020.01); *G06F 30/398* (2020.01); G06F 30/396 (2020.01); G06F 2119/12 (2020.01)

(56) References Cited

U.S. PATENT DOCUMENTS

| | | | | |
|---|---|---|---|---|
| 8,418,115 | B1* | 4/2013 | Tom | G06F 17/5072 |
| | | | | 716/105 |
| 8,473,881 | B1* | 6/2013 | Fang | G06F 17/5072 |
| | | | | 716/105 |
| 8,669,778 | B1* | 3/2014 | Or-Bach | G06F 17/505 |
| | | | | 326/37 |
| 8,712,718 | B1* | 4/2014 | Camarota | G01R 31/2894 |
| | | | | 702/117 |
| 8,732,647 | B1 | 5/2014 | Rusu et al. | |
| 9,064,077 | B2* | 6/2015 | Samadi | G06F 17/5072 |
| 9,310,827 | B2* | 4/2016 | Bartley | G06F 1/04 |
| 9,564,432 | B2* | 2/2017 | Or-Bach | H03K 17/687 |
| 9,922,151 | B2* | 3/2018 | Sarhan | G06F 17/5045 |
| 2011/0055791 | A1 | 3/2011 | Gao | |
| 2012/0331435 | A1* | 12/2012 | Rahman | H01L 25/0655 |
| | | | | 716/120 |
| 2013/0061195 | A1 | 3/2013 | Adya et al. | |

OTHER PUBLICATIONS

M. Reber et al., "Benefits of Vertically Stacked Integrated Circuits for Sequential Logic," 1996 IEEE, pp. 121-124. (Year: 1996).*

G. Karypis et al., "Multilevel Hypergraph Partitioning: Application in VLSI Domain," 1997 ACM Design Automation Conference, 4 pages. (Year: 1997).*

U.V. Catalyurek et al., "Hypergraph-Partitioning-Based Decomposition for Parallel Sparse-Matrix Vector Multiplication," IEEE Trans. on Parallel and Distributed Systems, vol. 10, No. 7, Jul. 1999, pp. 673-693. (Year: 1999).*

A.E. Caldwell et al., "Improved Algorithms for Hypergraph Bipartitioning," 2000 IEEE, pp. 661-666. (Year: 2000).*

Y. Deng et al., "Interconnect Characteristics of 2.5-D System Integration Scheme," 2001 ACM ISPD'01, pp. 171-175. (Year: 2001).*

K.A. Bowman et al., "Impact of Die-to-Die and Within-Die Parameter Fluctuations on the Maximum Clock Frequency Distribution for Gigascale Integration," IEEE Journal of Solid-State Circuits, vol. 37, No. 2, Feb. 2002, pp. 183-190. (Year: 2002).*

S. Das et al., "Design Tools for 3-D Integrated Circuits," 2003 Proc. Asia South Pacific Design Automation Conference, 4 pages. (Year: 2003).*

Z. Li et al., "Hierarchical 3-D Floorplanning Algorithm for Wirelength Optimization," IEEE Trans. on Circuits and Systems—I: Regular Papers, vol. 53, No. 12, Dec. 2006, pp. 2637-2646. (Year: 2006).*

C. Ferri et al., "Parametric Yield Management for 3D ICs: Models and Strategies for Improvement," ACM Journal on Emerging Technologies in Computing Systems, vol. 4, No. 4, Oct. 2008, 22 pages. (Year: 2008).*

H. Yan et al., "Efficient Hierarchical Algorithm for Mixed Mode Placement in Three Dimensional Integrated Circuit Chip Designs," Tsinghua Science and Technology, vol. 14, No. 2, Apr. 2009, pp. 161-169. (Year: 2009).*

S. Garg et al., "3D_GCP: An Analytical Model for the Impact of Process Variations on the Critical Path Delay Distribution of 3D ICs," 10th Int'l Symposium on Quality Electronic Design, 2009 IEEE, pp. 9 pages. (Year: 2009).*

C.-T. Lin et al., "CAD Reference Flow for 3D Via-Last Integrated Circuits," 2010 IEEE, pp. 187-192. (Year: 2010).*

Y.C. Hu et al., "A Multilevel Multilayer Partitioning Algorithm for Three Dimensional Integrated Circuits," 11th Int'l Symposium on Quality Electronic Design, 2010 IEEE, 5 pages. (Year: 2010).*

J.-S. Yang et al., "Robust Clock Tree Synthesis with Timing Yield Optimization for 3D-ICs," 2011 IEEE, pp. 621-666. (Year: 2011).*

T.-B. Chan et al., "Reliability-Constrained Die Stacking Order in 3DICs Under Manufacturing Variability," 14th Int'l Symposium on Quality Electronic Design, 2013 IEEE, 8 pages. (Year: 2013).*

D. Milojevic et al., "Design Issues in Heterogeneous 3D/2.5D Integration," 2013 IEEE, pp. 403-410. (Year: 2013).*

S. Garg et al., "Mitigating the Impact of Process Variation on the Performance of 3-D Integrated Circuits," IEEE Trans. on Very Large Scale Integration (VLSI) Systems, vol. 21, No. 10, Oct. 2013, pp. 1903-1914. (Year: 2013).*

S. Panth et al., "Design and CAD Methodologies for Low Power Gate-level Monolithic 3D ICs," 2014 ACM ISLPED'14, pp. 171-176. (Year: 2014).*

S. Panth et al., "Placement-Driven Partitioning for Congestion Mitigation in Monolithic 3D IC Designs," IEEE Trans. on Computer-Aided Design of Integrated Circuits and Systems, vol. 34, No. 4, Apr. 2015, pp. 540-553. (Year: 2015).*

O. Billoint et al., "A Comprehensive Study of Monolithic 3D Cell on Cell Design Using Commercial 2D Tool," 2015 EDDA Design, Automation & Test in Europe Conference & Exhibition, pp. 1192-1196. (Year: 2015).*

Bang et al., "Clock clustering and IO optimization for 3D integration", IEEE, Jul. 30, 2015, Abstract Only.

Caldwell et al., "Design and Implementation of the Fiduccia-Mattheyses Heuristic for VLSI Netlist Partitioning", Proceedings ALENEX '99 Selected papers from the International Workshop on Algorithm Engineering and Experimentation, pp. 177-193 (Jan. 15-16, 1999).

Cho et al., "Fast Approximation Algorithms on Maxcut, k-Coloring, and k-Color Ordering for VLSI Applications", IEEE Transactions on Computers, vol. 47, No. 11, pp. 1253-1266, Nov. 1998.

Cong et al., "Thermal-Aware 3D IC Placement Via Transformation", Proc. ASP-DAC, pp. 780-785, 2007.

Goemans et al., "Improved Approximation Algorithms for Maximum Cut and Satisfiability Problems Using Semidefinite Programming", Journal of the Association for Computing Machinery, vol. 42, No. 6, pp. 1115-1145, Nov. 1995.

Jiang, "Generic Integer Linear Programming Formulation for 3D IC Partitioning", Proc. IEEE ISOCC, pp. 321-324, 2009.

Juan et al., "Statistical Peak Temperature Prediction and Thermal Yield Improvement for 3D Chip Multiprocessors", ACM Journal on Emerging Technologies in Computing Systems, vol. 19, No. 4, Article 39, Aug. 2014.

Kahng et al., "Local Unidirectional Bias for Smooth Cutsize-Delay Tradeoff in Performance-Driven Bipartitioning", Proc. ISPD, pp. 81-86, 2003.

Karypis et al., "Multilevel k-way Hypergraph Partitioning", Proc. DAC, pp. 343-348, 1999.

Thorolfsson et al., "Logic-on-Logic 3D Integration and Placement", Proc. 3D Systems Integration Conference, pp. 1-4, 2010.

Copenheaver, International Search Report for Application No. PCT/US2016/064007, dated Jan. 30, 2017.

* cited by examiner

| Clustering. |
|---|
| 1: $cell\_list \leftarrow$ sort all cells in increasing order of their slacks |
| 2: for all $c \in cell\_list$ that is not clustered do |
| 3:    $queue.push\_from(c); u \leftarrow \emptyset$ // initialize cluster $u$ |
| 4:    while $|u| < N_{ub}$ do |
| 5:       $s' \leftarrow -\infty; c' \leftarrow \emptyset; queue' \leftarrow \emptyset$ |
| 6:       while $|queue| > 0$ do |
| 7:          $c \leftarrow queue.pop\_from()$ |
| 8:          $s_u \leftarrow slack(u); s_c \leftarrow slack(c)$ |
| 9:          move $c$ to a different tier; incremental timing analysis |
| 10:         if $|u| == 0 \mid\mid slack(u) \geq s_u\ \&\&\ slack(c) \geq s_c$ then |
| 11:            $u \leftarrow u \cup \{c\}$ |
| 12:            if $|u| \geq N_{ub}$ then |
| 13:               break |
| 14:            end if |
| 15:            $queue.push\_back($neighbors of $c$ that are not clustered$)$ |
| 16:         else |
| 17:            if $min(slack(c), slack(u)) > s'$ then |
| 18:               $s' \leftarrow min(slack(c), slack(u)); c' \leftarrow c$ |
| 19:            end if |
| 20:            $queue'.push\_back(c)$ |
| 21:            recover $c$ to its original tier; incremental timing analysis |
| 22:         end if |
| 23:       end while |
| 24:       if $|u| \geq N_{ub} \mid\mid |queue'| == 0$ then |
| 25:          break |
| 26:       end if |
| 27:       move $c'$ to a different tier; incremental timing analysis |
| 28:       $u \leftarrow u \cup \{c'\}$ |
| 29:       $queue.push\_back($neighbors of $c'$ that is not clustered$)$ |
| 30:       $queue.push\_back(queue'); queue' \leftarrow \emptyset$ |
| 31:    end while |
| 32: end for |

FIG. 5

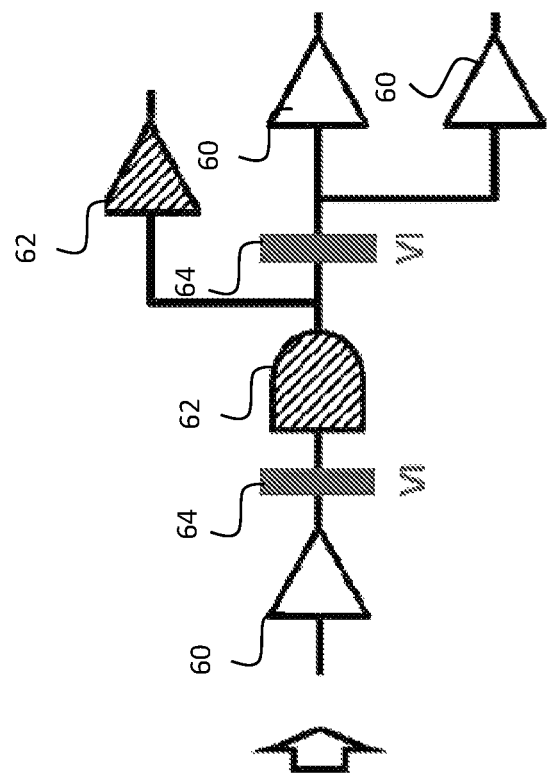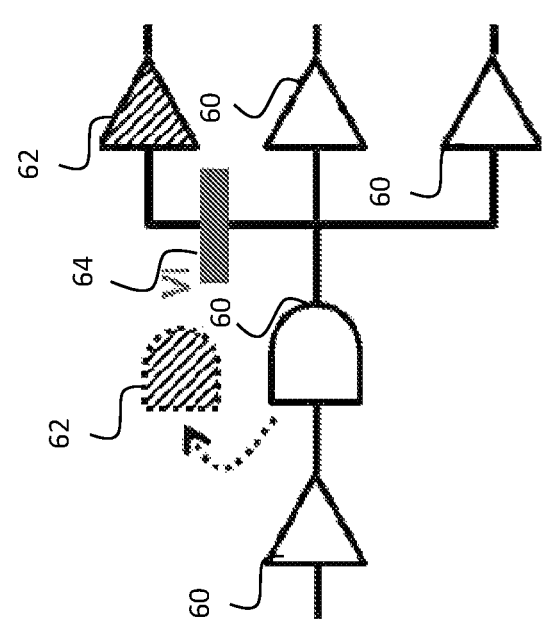
FIG. 6

| Design | Flow | WNS (ps) | TNS (ns) | Area ($\mu m^2$) | Power (mW) | #Instances | Wirelength ($\mu m$) | #V1s | Utilization (bottom / top) |
|---|---|---|---|---|---|---|---|---|---|
| ARM Cortex M0 | brute-force (orig) | -178 | -56.735 | 8451 | 6.701 | 8816 | 116966 | 304 | 77% / 69% |
| | brute-force (opt) | -23 | -0.173 | 8448 | 6.210 | 8780 | 136631 | 2744 | 70% / 76% |
| | shrunk2D (orig) | -89 | -11.040 | 9697 | 6.499 | 9855 | 83462 | 3715 | 83% / 86% |
| | shrunk2D (opt) | -13 | -0.080 | 10106 | 6.985 | 9982 | 93495 | 4490 | 86% / 90% |
| AES | brute-force (orig) | -181 | -26.113 | 8536 | 10.700 | 10964 | 129896 | 250 | 74% / 70% |
| | brute-force (opt) | -8 | -0.012 | 8554 | 9.351 | 10947 | 156716 | 4417 | 65% / 79% |
| | shrunk2D (orig) | -4 | 0.000 | 9621 | 10.600 | 11302 | 113209 | 4787 | 78% / 81% |
| | shrunk2D (opt) | 56 | 0.000 | 9611 | 10.200 | 11356 | 116816 | 6304 | 75% / 83% |
| MPEG | brute-force (orig) | -68 | -2.043 | 18089 | 13.900 | 13152 | 227734 | 307 | 69% / 73% |
| | brute-force (opt) | 73 | 0.000 | 18125 | 14.100 | 13183 | 321866 | 4674 | 74% / 67% |
| | shrunk2D (orig) | 20 | 0.000 | 18620 | 14.800 | 13275 | 158386 | 4741 | 72% / 74% |
| | shrunk2D (opt) | 79 | 0.000 | 18691 | 15.400 | 13279 | 174804 | 7727 | 77% / 70% |
| JPEG | brute-force (orig) | -155 | -7.094 | 44758 | 32.100 | 36521 | 703770 | 1159 | 69% / 72% |
| | brute-force (opt) | -52 | -0.462 | 45094 | 31.800 | 36631 | 1007136 | 12571 | 76% / 67% |
| | shrunk2D (orig) | -115 | -1.760 | 54457 | 42.900 | 52824 | 520123 | 14075 | 85% / 88% |
| | shrunk2D (opt) | -82 | -1.210 | 54637 | 43.000 | 52947 | 562430 | 20635 | 88% / 85% |
| VGA | brute-force (orig) | -244 | -6.213 | 100143 | 113.300 | 72682 | 2201814 | 1546 | 76% / 70% |
| | brute-force (opt) | -80 | -0.251 | 102683 | 117.200 | 72731 | 3667133 | 15353 | 70% / 80% |
| | shrunk2D (orig) | -47 | -0.270 | 104525 | 90.000 | 73950 | 904742 | 27780 | 76% / 77% |
| | shrunk2D (opt) | 11 | 0.000 | 104008 | 86.800 | 74051 | 929942 | 35908 | 79% / 73% |

FIG. 9

MULTI-DIE IC LAYOUT METHODS WITH AWARENESS OF MIX AND MATCH DIE INTEGRATION

PRIORITY CLAIM AND REFERENCE TO RELATED APPLICATION

The application claims priority under 35 U.S.C. § 119 and all applicable statutes and treaties from prior U.S. provisional application Ser. No. 62/261,261, which was filed Nov. 30, 2015.

STATEMENT OF GOVERNMENT INTEREST

This invention was made with government support under grant numbers 1117770 and 1162085 awarded by National Science Foundation. The government has certain rights in the invention.

FIELD

A field of the invention is integrated circuit fabrication and another field is optical lithography. Example applications of the invention include synthesis, floor planning, placement and routing of three dimensional VLSI circuits. Another example application of the invention is circuit design optimizers. Applications of the invention include IC layouts for multi-die IC layouts that are stacked vertically (3D IC) or tiled horizontally (2.5D IC).

BACKGROUND

A three-dimensional integrated circuit (3DIC) is a multi-die integrated circuit manufactured by stacking silicon wafers and/or dies and interconnecting the dies vertically with vertical interconnections (VI). 3DIC typically provides reduction of wirelength and footprint compared to conventional 2D integrated circuits. A 2.5D IC is a multi-die horizontally tiled integrated circuit that uses VI to connect to a metallization layer for die-to-die connections. 2.5D ICs can provide capacity, performance, system space and overall system power consumption improvements compared traditional single die ICs.

3DIC and 2.5D IC are of therefore of great interest for cost and density scaling, as well as performance improvements. Mix-and-match die integration is an integration strategy that stacks or tiles slow (or smaller leakage) dies with fast (or more leakage) dies to improve parametric yield. Conventional approaches design each of the stacked or tiled dies independently. Thus, there is no holistic design achieved for the eventual stacking or tiling of any of the die.

Examples of these types of methods for mix-and-match die integration have been the subject of many publications. Ferri et al. [C. Ferri, S. Reda and R. I. Bahar, "Parametric Yield Management for 3D ICs: Models and Strategies for Improvement", ACM JETCS 4(4) (2008), pp. 19:1-19:22] propose methodologies to benefit from the flexibility of die-to-die and/or die-to-wafer 3D integration with awareness of the inter-die process variation. Their optimization is reported to improve performance and parametric yield of 3DICs with one CPU die and one L2 cache die. Garg et al. [S. Garg and D. Marculescu, "Mitigating the Impact of Process Variation on the Performance of 3-D Integrated Circuits", IEEE TVLSI 21(10) (2013), pp. 1903-1914] describe mathematical programs to improve the performance yield of 3DICs via mix and-match die integration. Chan et al. [T.-B. Chan, A. B Kahng and J. Li, "Reliability-Constrained Die Stacking Order in 3DICs under Manufacturing Variability", Proc. ISQED, 2013, pp. 16-23] propose an integer linear programming-based method as well as a heuristic method to optimize reliability of 3DICs (i.e., to improve the mean time to failure).

To avoid the large runtime of thermal simulation, Juan et al. [D.-C. Juan, S. Garg and D. Marculescu, "Statistical Peak Temperature Prediction and Thermal Yield Improvement for 3D Chip Multiprocessors", ACM TODAES 19(4) (2014), pp. 39:1-39:23] describes a learning-based model for temperature prediction in 3DICs. Based on the model, thermal-aware matching and stacking of dies is conducted to improve thermal yield.

Li et al [Z. Li, X. Hong, Q. Zhou, Y. Cai, J. Bian, H. H. Yang, V. Pitchumani, C.-K. Cheng, "Hierarchical 3-D Floorplanning Algorithm for Wirelength Optimization", IEEE Trans Circuits Syst I 53(12) (2006), pp. 2637-2646] use a simulated annealing engine to partition blocks across tiers during the floorplanning stage to minimize wirelength. Others have cast 3D partitioning as a form of standard hypergraph partitioning. Thorolfsson et al. [T. Thorolfsson, G. Luo, J. Cong and P. D. Franzon, "Logic-on-logic 3D Integration and Placement", Proc. 3D Systems Integration Conference, 2010, pp. 1-4.] use hMetis to partition the design into balanced halves while minimizing the number of cuts. A multilevel partitioning methodology is proposed in [Y. C. Hu, Y. L. Chung and M. C. Chi, "A Multilevel Multilayer Partitioning Algorithm for Three Dimensional Integrated Circuits", Proc. ISQED, 2010, pp. 483-487], which first applies Hyperedge Coarsening (HEC) techniques to coarsen the netlist, then performs an FM-like K-way partitioning procedure to partition the netlist such that the number of VIs is minimized. An integer linear programming for 3D partitioning is formulated in [I. H.-R. Jiang, "Generic Integer Linear Programming Formulation for 3D IC Partitioning", Proc. IEEE ISOCC, 2009. pp. 321-324], where the objective is to reduce the number of VIs subject to area balancing constraints.

Partitioning methodologies based on an initial 2D implementation solution have also been proposed. Cong et al. [J. Cong, G. Luo, J. Wei and Y. Zhang, "Thermal-Aware 3D IC Placement Via Transformation", Proc. ASP-DAC, 2007, pp. 780-785] assign cells to tiers through folding-based transformations of an initial 2D placement solution. Based on a 2D implementation solution with scaled dimension (i.e., 0.7x), Path overall routing overflow; this can mitigate routing congestion and help overall routing overflow. This can also mitigate routing congestion and help minimize wirelength.

These prior optimization approaches operate at die level or wafer level (essentially, post-manufacturing). None of these methods address design-stage optimization and signoff for mix-and-match die integration. There are no techniques or system provided in these prior publications for optimization at time of design compilation. None of these works integrate mix-and-match die integration into design compilation.

The Fiduccia-Mattheyses (FM) optimization is a hypergraph partitioning heuristic that has been used in the context of VLSI design to conduct netlist partitioning in design optimizers. See, e.g., Caldwell et al., "Design and Implementation of the Fiduccia-Mattheyses Heuristic for VLSI Netlist Partitioning," Proceedings ALENEX '99 Selected papers from the International Workshop on Algorithm Engineering and Experimentation, pp. 177-193 (Jan. 15-16, 1999). One example FM technique minimizes the number of cuts during design compilation. G. Karypis and V. Kumar, "Multilevel K-Way Hypergraph Partitioning", Proc. DAC, 1999, pp. 343-348. Another technique minimizes the number of paths passing across different partitions. See, See, A. B. Kahng and X. Xu, "Local Unidirectional Bias for Smooth Cutsize-Delay Tradeoff in Performance-Driven Bipartitioning", Proc. ISPD, 2003, pp. 81-86. Such prior techniques fail to directly address timing slack or use a priori knowledge of mix-and-match constraints in 3D designs. Typical prior techniques only minimize the number of cuts (or vertical interconnects) between dies and are not aware of the mix-and-match context for timing analysis.

SUMMARY OF THE INVENTION

Methods and systems of the invention use partitioning methods that directly maximize the design's timing slack in the mix-and-match regime during design compilation. An embodiment of the invention is a method for optimizing a multi die implementation flow that is aware of mix-and-match die integration for implementing multi-die integrated circuits includes partitioning a netlist into partitions comprehending mix-and-match die integration, wherein each partition will be assigned to a die. Each partition is placed into a corresponding die. A clock tree of the integrated circuit is synthesized. Nets of the integrated circuit in are routed in accordance with the placing and synthesizing.

BRIEF DESCRIPTION OF THE DRAWINGS

FIG. 5 is pseudo code of a preferred clustering method;

FIG. 6 illustrates an example of VI insertion/removal across tiers;

FIG. 9 is a table of experimental data that illustrates the performance of the present partitioning compared to prior works.

DETAILED DESCRIPTION OF THE PREFERRED EMBODIMENTS

Figure 1:
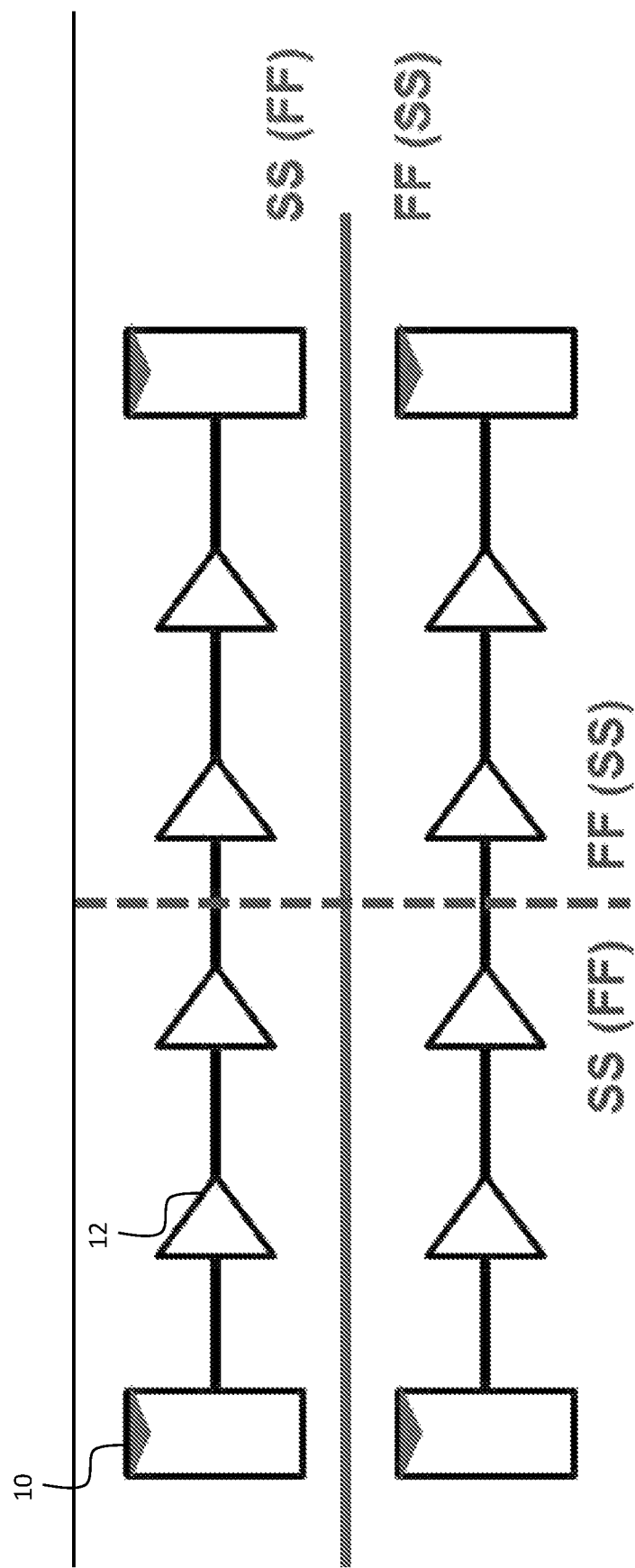
FIG. 1 is a schematic diagram illustrating how a partitioning solution can impact design signoff timing in the regime of mix-and-match stacking.
Figure 2A:
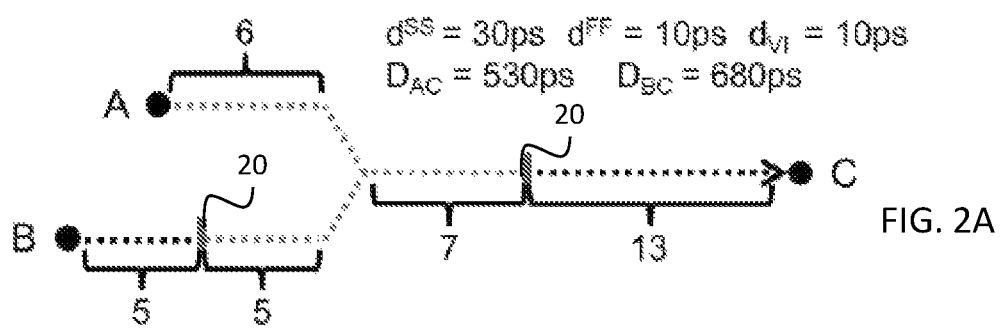
FIGS. 2A-D illustrate a simple example with different optimal partitioning solutions that minimize (a) delay of path A-C, (b) delay of path B-C, and (c) the worst case over the two paths.
Figure 2B:
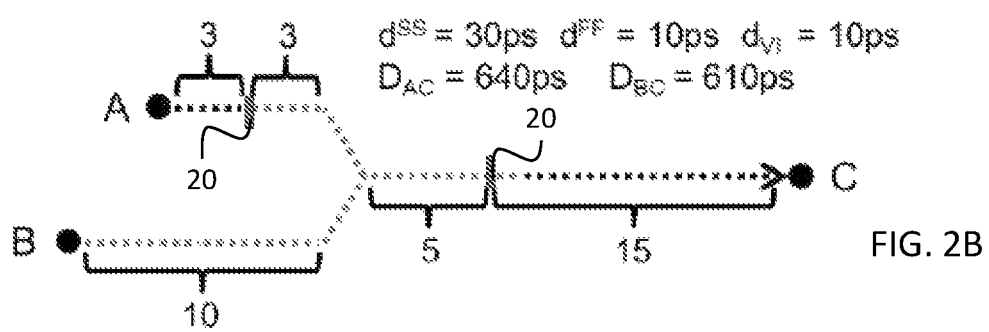
Figure 2C:
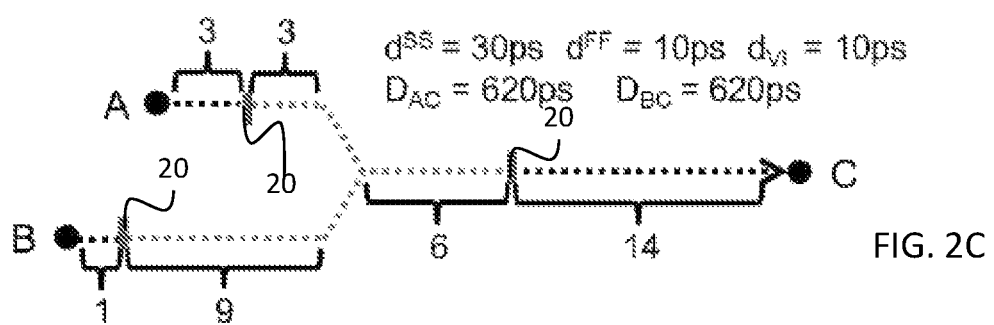
Figure 2D:
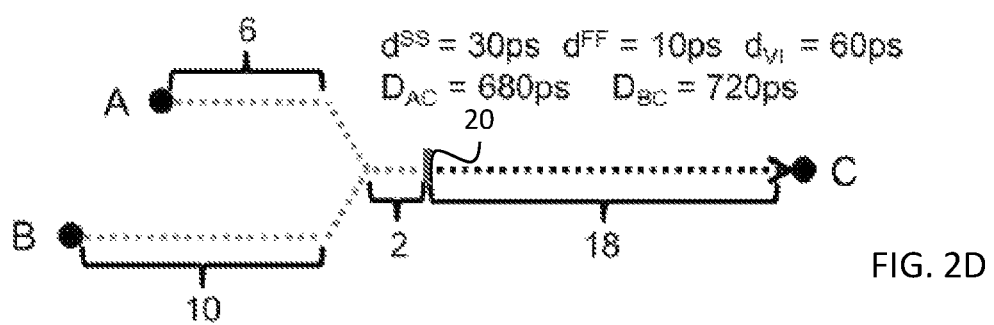

The invention provides systems and methods for multi-die IC layout with awareness of mix and match die integration (die stacking or tiling), implemented at the time of design compilation. An embodiment of the invention is a method for synthesizing a multi-die layout, with partitioning and routing conducted with an awareness mix-and-match die stacking or tiling. Preferred methods are implanted in design optimizers and can provide a VLSI layout for 3D IC or 2.5D IC fabrication. Preferred methods are able to conduct a layout at the design stage with awareness of mix-and-match dies. Additional methods include fabrication of 3D IC and 2.5D IC circuits in accordance with a 3D IC or 2.5D IC layout.

While not necessary to demonstrate the merit of the invention, and without limiting the invention, we believe that the invention provides the first design-stage optimization for mix-and-match die stacking or tiling. Example experimental simulations provide up to a 6% timing improvement as compared to a min-cut based partitioning approach. Further experiments showed that, using foundry 28 nm FDSOI 12-track, dual-$V_{th}$ (transistor voltage threshold) libraries, the preferred method achieves 7% performance improvement compared to the conventional worst-case signoff with a state-of-the-art 3DIC implementation flow on ARM Cortex M0. Additional experimental results further show that our preferred optimization flow achieves up to 16% timing improvement as compared to the existing 3DIC implementation flow in the context of mix-and-match die integration.

A preferred system of the invention includes a system for 3D IC or 2.5D circuit synthesis, floor planning, placement and routing that provides a layout to an optical lithography system. The optical lithography system uses the layout to pattern material, e.g., photoresist. The system develops the material to provide a mask that is then used to fabricate VLSI integrated circuit features. The system, as described in the present invention, or any of its components, can be embodied in the form of a computer system, such as a design optimizer. Typical examples of a computer system include a general-purpose computer, a programmed microprocessor, a micro-controller, a peripheral integrated circuit element, and other devices or arrangements of devices that are capable of implementing the steps that constitute the method of the present invention. The computer system can comprise a computer, an input device, a display unit, and the Internet. The computer comprises a microprocessor, which is connected to a communication bus. The computer also includes a memory, which can include Random Access Memory (RAM) and Read Only Memory (ROM). The computer system further comprises a storage device which can be a hard disk drive or a removable storage drive such as a floppy disk drive, optical disk drive, and so forth. The storage device can also be other similar means of loading computer programs or other instructions into the computer system. The computer system executes a set of instructions that are stored in one or more storage elements, in order to process input data. The storage elements can also hold data or other information, as desired. The storage element can be in the form of an information source or a physical memory element present in the processing machine. Exemplary storage elements include hard disk, DRAM, SRAM and EPROM. The storage element can also be external to the computer system, and connected to or inserted into the computer, for download at or prior to the time of use. Examples of such external computer program products are computer-readable storage media such as CD-ROMs, flash chips, floppy disks, and so forth. The set of instructions can include various commands that instruct the processing machine to perform specific tasks, such as the steps that constitute the method of the present invention. The set of instructions can be in the form of a software program. The software can be in various forms, such as system software or application software. Further, the software might be in the form of a collection of separate programs, a program module with a larger program, or a portion of a program module. The software might also include modular programming in the form of object-oriented programming. The software program containing the set of instructions can be embedded in a computer program product, for use with a computer. The computer program product comprises a computer-usable medium having a computer-readable program code embodied therein. The processing of input data by the processing machine can be in response to user commands or in response to results of previous processing, or in response to a request made by another processing machine.

Preferred methods improve performance of 3D IC and 2.5D IC design by leveraging the knowledge of mix-and-match die stacking and tiling during manufacturing. Preferred methods provide partitioning approaches to partition timing-critical paths across dies to explicitly optimize a previously determined and signed-off timing across the reduced set of corner combinations that can be produced by the stacked or tiled-die manufacturing. These include both an ILP-based methodologies and a heuristic method with novel maximum-cut partitioning, solved by semidefinite programming, and a signoff timing aware FM optimization.

Additional preferred methods modify two existing 3D IC implementation flows to incorporate mix-and-match-aware partitioning and signoff, demonstrating the wide applicability of the present methods and systems in design optimizers.

Methods of the invention account for issues that are non-trivial in partitioning for mix-and-match die stacking or tiling. Such issues include recognition that the optimal cut locations on one timing path might conflict with those on other timing paths. In the case of conflict, the partitioning optimization must trade off timing optimizations among timing paths. This can be quite challenging in a design with large number of potentially critical paths and shared logic cones among multiple pairs of timing startpoints-endpoints. Further, the partitioning optimization must account for the timing impact of vertical interconnects (e.g., through-silicon vias), that is, it cannot "freely" partition a timing path into segments. In addition, delay variations across different process conditions can be different for cells of different types (e.g., INV, NAND or NOR), sizes and $V_{th}$. Last, asymmetric distribution of process bins (e.g., 3σ SS+2σ FF) also increases the difficulty of the partitioning optimization. SS indicates a slow die or a die with less leakage power (compared to an FF die or a predetermined threshold); FF indicates a fast die or a die with larger leakage power (compared to an SS die or a predetermined threshold). An additional die type can be TT for a typical speed or leakage power die.

In a preferred ILP-based partitioning method of the invention, an integer linear program (ILP) is constructed to partition a netlist into two dies (arranged as tiers in a vertical 3D IC stack or as horizontal tiles in a 2.5D IC layout) such that the worst timing slack, over the corner combinations that can be formed by mix-and-match stacking, is maximized. An objective is to minimize the maximum path delay over all timing paths across all relevant pairs of process corners in the context of mix-and-match die integration. The constraints in the formulated ILP include the maximum path delay constraints and area balancing constraints. Delays of vertical interconnects are considered. Each cell is assigned with a binary indicator to determine the partitioning solution.

Another preferred method of the invention is a timing-aware Fiduccia-Mattheyses (FM) partitioning methodology with better scalability. The present heuristic partitioning methodology contains two optimization stages—(i) the global optimization stage performs maximum cut on the timing-critical sequential graph (i.e., a partial sequential graph which contains only startpoints and endpoints of timing-critical paths) and (ii) the local optimization stage performs timing-aware multi-phase FM optimization to achieve the final partitioning solution. The gain function used in our FM optimization is defined as the slack improvement by moving a cell/cluster from one partition to another, normalized to the worst slack of the design.

In the global optimization stage, preferred methods and systems classify timing paths of a given design into three categories—(1) timing non-critical paths, (2) timing-critical paths without tolerance of VI insertion, and (3) timing-critical paths with tolerance of VI insertions. The preferred global optimization focuses on timing-critical paths (i.e., paths from (2) and (3) categories). The preferred global optimization ensures that startpoint and endpoint of a path from the (2) category are assigned to the same tier. Further, the preferred global optimization maximizes the number of paths from (3) category being partitioned, so as to improve the potential timing benefits from mix-and-match die integration. The preferred global optimization is based on the sequential graph, where each startpoint or endpoint (e.g., register, PI or PO) becomes one vertex, and a directed edge is inserted between two vertices if there exists a (combinational) timing path between the vertices when they are taken as startpoint and endpoint.

In the incremental optimization stage, preferred methods and systems cluster cells at each phase before the FM optimization to reduce the runtime of FM optimization and improve the solution quality. Specifically, to accurately evaluate the gain function of one cell including its future impact, a large number of potential moves of its neighbor cells is evaluated. The number of potential future move sequences can be large if only moving multiple stages of cells can compensate for the delay impact of vertical interconnect insertions. The methods and systems cluster cells such that timing improvement from moving a cluster can compensate for the delay impact of vertical interconnect insertions.

The present partitioning methodology can be applied in any 3D IC or 2.5D IC implementation flow of VLSI chip design for improved performance and parametric yield. IC fabrications can be conducted with designs provided by the present methods.

Preferred embodiments of the invention will now be discussed with respect to the drawings. The drawings may include schematic representations, which will be understood by artisans in view of the general knowledge in the art and the description that follows. Features may be exaggerated in the drawings for emphasis, and features may not be to scale.

The following description of a preferred embodiment concerns a vertical 3D IC stack, and therefore the separate dies are tiers. However, the same approach is application to a horizontal IC arrangement, where the separate dies are tiles. For example, the die SS Tier 1 becomes SS Tile 1. The following description also assumes that dies are classified into two process bins, SS and FF. However, given matched pairs of process bins based on die-level and/or wafer-level stacking optimization, the approaches described herein can be extended to scenarios with >2 process bins, e.g., additional combinations (such as Typical dies TT) can be {SS Tier 0+TT Tier 1, TT Tier 0+SS Tier 1, FF Tier 0+TT Tier 1, TT Tier 0+FF Tier 1, TT Tier 0+TT Tier 1} when we also consider the TT process bin. Prior works (discussed in the background) have suggested approaches for partitioning of logic into multiple dies, e.g., to obtain the wirelength (hence, power and delay) savings implied by implementing a 1×1 die area into two stacked or tiled 0.7×0.7 dies. However, the signoff criteria used to implement such a multi-die solution must necessarily validate timing correctness for all combinations of process conditions on the multiple stacked dies—e.g., the four combinations {SS Tier 0+SS Tier 1, SS Tier 0+FF Tier 1, FF Tier 0+SS Tier 1, FF Tier 0+FF Tier 1}. Satisfying this combinatorial number of signoff constraints induces area and power overheads as a result of the sizing and buffering operations needed to close timing.

Preferred embodiments accomplish of design partitioning and signoff for mix-and-match die integration using a priori knowledge. In particular, if the optimizer knows a priori that, for example, SS Tier 0 and SS Tier 1 die will never be stacked together, or that FF Tier 0 and FF Tier 1 die will never be stacked together, this changes their signoff criteria. Even more, this a priori knowledge allows the optimizer to partition timing-critical paths across tiers to explicitly optimize the design's performance in the regime of mix-and-match stacking. Here, a priori knowledge is process information. In other words, the method has knowledge as to whether a die is fast or slow, e.g. FF or SS, before integration, which ensures that two slow dies will not be integrated in a mix-and-match context for parametric yield improvement. Such a priori knowledge is used for timing analysis and evaluation of the timing constraints during ILP and heuristic optimization. As mentioned above, SS indicates a slow die or a die with less leakage power (compared to an FF die or a predetermined threshold); FF indicates a fast die or a die with larger leakage power (compared to an SS die or a predetermined threshold). More specifically, the letters can indicate carrier mobility of nMOS and pMOS transistors. Such that SS indicate slow nMOS and slow pMOS. Tier 0 is the bottom tier in a 3D design; Tier 1 is the top tier in a 3D design. Tiers in a 3D design (or dies in a 2.5D design) are connected with vertical interconnects. SS Tier 0+FF Tier 1 indicates integration/interconnection of a slow bottom tier with a fast top tier in a 3D design.

FIG. 1 provides an example that illustrates how the partitioning solution can impact design signoff timing in the regime of mix-and-match stacking. FIG. 1 labels Tier 0 and Tier 1, each of which includes flip-flops 10 and combinational logic gates 12. The partitioning solution affects a design's performance in the regime of mix-and-match stacking. Assuming that SS Tier 0+FF Tier 1 and SS Tier 1+FF Tier 0 are utilized for die stacking, the partitioning solution indicated by the vertical dotted line has the maximum timing slack, while the partitioning solution indicated by the horizontal line has the minimum timing slack.

An optimizer of the invention conducts partitioning methodologies and signoff flows that are aware of mix-and-match die integration to improve design timing (i.e., to improve worst negative slack (WNS)). The 3D partitioning for mix-and-match die stacking is nontrivial because of a number of constraints. First, the optimal cut locations on one timing path might conflict with those on other timing paths. Thus, the partitioning optimization must trade off timing optimizations among timing paths. This can be quite challenging in a design with large number of potentially critical paths and shared logic cones among multiple pairs of timing startpoints and endpoints. Further, the partitioning optimization must comprehend timing impact of vertical interconnects (e.g., through-silicon vias), that is, it cannot "freely" partition a timing path into segments. In addition, delay variations across different process conditions can be different for cells of different types (e.g., INV, NAND or NOR), sizes and $V_{th}$ types. Last, asymmetric distribution of process bins (e.g., 3 s SS+2 s FF) will also increase the difficulty of the partitioning optimization.

FIGS. 2A-D illustrate a simple example with different optimal partitioning solutions that minimize (a) delay of path A-C, (b) delay of path B-C, and (c) the worst case over the two paths. Moreover, the optimal partitioning solution changes with increased VI delay impact. Area-balanced partitioning solutions on path A-C (26 stages) and path B-C (30 stages) which respectively minimize (a) delay of path A-C (DAC), (b) delay of path B-C (DBC), (c) worst-case delay over the two paths, and (d) worst-case delay over the two paths in the regime of large VI delay impact (dVI). VIs 20 are labelled in each of FIGS. 2A-D. The example assumes the same stage delay (30 ps at SS, 10 ps at FF) for every stage in the two paths. Timing analysis is aware of mix-and-match stacking (i.e., {SS Tier 0+FF Tier 1, FF Tier 0+SS Tier 1}) and assumes ideal clock. The optimizer performs timing analysis of each tier (or tile) at slow and fast corners to estimate the clock delay at both fast and slow corners. The optimizer then uses the clock delay assuming slow bottom tier+fast top tier and fast bottom tier+slow top tier for timing analysis, verification as well as optimization on datapaths.

Preferred embodiments will be described with respect to an optimizer containing an integer linear program (ILP) to partition a netlist into two tiers such that the worst timing slack, over the corner combinations that can be formed by mix-and-match stacking, is maximized. Table I summarizes notations used in the description.

TABLE I

DESCRIPTION OF NOTATIONS USED IN OUR WORK.

| Term | Meaning |
| --- | --- |
| $\alpha_j$ | process condition (corner), $(1 \le j \le J)$ |
| P | set of timing paths |
| $p_k$ | $k^{th}$ timing path $(p_k \in P)$ |
| C | set of cells |
| $c_i$ | $i^{th}$ cell $(c_i \in C)$ |
| $a_i$ | area of cell $c_i$ |
| $y_i$ | binary indicator whether cell $c_i$ is on Tier 0 ($y_i = 0$) or on Tier 1 ($y_i = 1$) |
| $\beta_{i,i'}$ ($\beta_{i',i}$) | binary indicator whether a cut (VI) exists between adjacent cells $c_i$ and $c_{i'}$, where cell $c_i$ is on Tier 0 (Tier 1) while cell $c_{i'}$ is on Tier 1 (Tier 0). |
| $d_i^j$ | stage delay of cell $c_i$ and its fanout wire at $\alpha_j$ |
| $D_k$ | maximum delay of path $p_k$ over all pairs of process corners |
| $D_{max}$ | maximum delay over all paths among all pairs of process corners |
| $d_{VI}$ | delay impact of VI insertion |
| $\theta$ | area balancing criterion |

The preferred method begins with minimizing $D_{max}$ subject to the following constraints:

$$\beta_{i,i'} \ge y_{i'} - y_i \ \forall \text{ adjacent cells } c_i, c_{i'} \in C \quad (1)$$

$$\beta_{i,i'} \ge y_i - y_{i'} \ \forall \text{ adjacent cells } c_i, c_{i'} \in C \quad (2)$$

$$\beta_{i,i'} + \beta_{i',i} \le 1 \ \forall \text{ adjacent cells } c_i, c_{i'} \in C \quad (3)$$

$$\sum_{c_i \in p_k} \left( d_i^j \cdot (1 - y_i) + d_i^{j'} \cdot y_i \right) + \quad (4)$$

$$\sum_{\text{adjacent } c_i, c_{i'} \in p_k} \left( \Delta_p^{j,j'} \cdot \beta_{i,i'} + \Delta_{i'}^{j',j} \cdot \beta_{i',i} \right) +$$

$$\sum_{\text{adjacent } c_i, c_{i'} \in p_k} (\beta_{i,i'} + \beta_{i',i}) \cdot d_{VI} \le D_k \ \forall \ (\alpha_j, \alpha_{j'}), p_k \in P$$

$$D_k \le D_{max} \ \forall \ p_k \in P \quad (5)$$

-continued $$\sum_{c_i \in C} a_i \cdot y_i - \sum_{c_i \in C} a_i \cdot (1 - y_i) \leq \theta \cdot \sum_{c_i \in C} a_i \quad (6)$$

$$\sum_{c_i \in C} a_i \cdot (1 - y_i) - \sum_{c_i \in C} a_i \cdot y_i \leq \theta \cdot \sum_{c_i \in C} a_i \quad (7)$$

The objective is to minimize the maximum path delay $D_{max}$ over all paths $p_k \in P$, across all relevant pairs of process corners in the context of mix-and-match die integration. $y_i$ is a binary indicator of cell $c_i$'s tier assignment, with $y_i=0$ (respectively, $y_i=1$) indicating that $c_i$ is on Tier 0 (resp. Tier 1). For any pair of adjacent cells $c_i$ and $c_{i'}$, Constraints (1) and (2) force either $\beta_{i,i'}$ and $\beta_{i',i}$ to be one when cells $c_i$ and $c_{i'}$ are on different tiers. In other words, $\beta_{i,i'}$ and $\beta_{i',i}$ are indicators of a cut (or VI) such that $\beta_{i',i}=1$ (resp. $\beta_{i,i'}=1$) when $c_i$ is on Tier 0 (resp. Tier 1) while $c_{i'}$ is on Tier 1 (resp. Tier 0). Therefore, $\beta_{i,i'}$ and $\beta_{i',i}$ are mutually exclusive.

Constraint (4) defines the maximum delay $D_k$ for each path $p_k \in P$ among all pairs of process corners with mix-and-match stacking. The first term on the left side of Constraint (4) is the sum of stage delays along path $p_k$. We Stage delays are extracted at a particular corner $\alpha_j$ based on the timing analysis assuming all cells are at $\alpha_j$. However, such an assumption can lead to an inaccurate stage delay estimation because cells of different process corners output different slews, which affect the delays of downstream cells. For example, the assumption can be pessimistic for a cell at SS when its driver is at FF. This is because to estimate the stage delay at SS, this timing analysis assumes all cells (including its driver) are at SS, which results in pessimistic input slew estimation. To compensate for such inaccuracy, the preferred method pre-calculates the delta stage delays (that is, the second term) between the case where the driver cell $c_i$ and the driven cell $c_{i'}$ are at different process corners (i.e., $c_i$ is at $\alpha_j$, and $c_{i'}$ is at $\alpha_{j'}$) versus the case where the $c_i$ is at the same process corner as $c_{i'}$. Such delta stage delays are denoted as $\Delta_i^{j,j'}$. Therefore, the second term are the sum of delta stage delays along path $p_k$ to achieve an accurate delay estimation. Further, the third term accounts for VI delay impact along the path. Artisans will note that VI insertion at the output pin of a small-size cell can have quite large delay impact. However, such delay impact can be addressed with sizing/VT-swapping optimization during the P&R (placement and routing) flow. Since no sizing/VT-swapping optimization is involved during the partitioning stage, to avoid pessimism in estimation of VI delay impact, the method preferably simply uses a constant value to estimate the delay impact of one VI insertion. Constraint (5) obtains the maximum delay $D_{max}$ over all paths $p_k \in P$. The method satisfies area balancing criteria, which are indicated by $\Theta$ in Constraints (6) and (7). $\Theta$ was set as 5% in experiments.

Additional embodiments provide a heuristic partitioning method that can reduce runtime compared to the ILP embodiment and can better extract all possible timing paths in large designs. The heuristic method of the present invention is based upon the Fiduccia-Mattheyses (FM) optimization, which is altered to be timing-aware and multi-phase. Unlike FM approaches discussed in the background, the present method directly targets timing slack improvement during partitioning optimization.

The objective of the method is to minimize the maximum path delay (i.e., maximize the worst timing slack) for mix-and-match die integration. Surprisingly, we have demonstrated with the method that a maximum cut partitioning is more suitable than the traditional minimum cut partitioning for 3DICs in the mix-and-match regime. To our knowledge, no previous works have applied a semidefinite program-based maximum cut optimization (provided by Goemanns-Williamson) to VLSI design. See, M. X. Goemans and D. P. Williamson, "Improved Approximation Algorithms for Maximum Cut and Satisfiability Problems Using Semidefinite Programming", J. ACM 42(6) (1995), pp. 1115-1145. Some previous works attempted to map Goemans-Williamson's algorithm to VLSI applications (e.g., "Fast Approximation Algorithms on Maxcut, k-Coloring, and k-Color Ordering for VLSI Applications", Cho et al. 1998), but failed due to large runtime.

Consider a tradeoff between delay impact of VI insertions versus timing improvement from mix-and-match stacking. Without loss of generality, assume a die stacking of {SS Tier 0+FF Tier 1, FF Tier 0+SS Tier 1}.

Denote the path delay of path $p_k$ at SS (resp. FF) as DSS k (resp. DFF k), and the total number of stages along $p_k$ as $l_k$. Approximating the path delay as a linear function of the stage number and assuming that there are $l'_k$ stages on Tier 0, the corresponding path delay without considering delay impact of VI insertion can be estimated as:

$$l'_k \cdot \frac{D_k^{SS}}{l_k} + (l_k - l'_k) \cdot \frac{D_k^{FF}}{l_k} \quad (8)$$

$$l'_k \cdot \frac{D_k^{FF}}{l_k} + (l_k - l'_k) \cdot \frac{D_k^{SS}}{l_k} \quad (9)$$

where (8) assumes the stacking of SS Tier 0+FF Tier 1, and (9) assumes the stacking of FF Tier 0+SS Tier 1. Maximizing the minimum value between (8) and (9) corresponds to having (8)=(9) and $l'_k = l_k/2$. The timing improvement from mix-and-match stacking over the worst-case analysis can thus be estimated (i.e., SS Tier 0+SS Tier 1) as $(D_k^{SS} - D_K^{FF})/2$. The worst slack of $p_k$ among combinations of process conditions (i.e., {SS Tier 0+FF Tier 1, FF Tier 0+SS Tier 1}) is denoted as $s_k$, and the delay increase due to an inserted VI as $d_{VI}$. The method then classifies timing paths of a design into three categories:

Type I—Timing non-critical paths: $s_k \geq s_{th}$;

Type II—Timing-critical paths without tolerance of VI insertion $$s_k < s_{th} \ \&\& \ \frac{(D_k^{ss} - D_K^{FF})/}{2} \leq d_{VI} + s_{gb}$$

Type III—Timing-critical paths with tolerance of VI insertion $$s_k < s_{th} \ \&\& \ \frac{(D_k^{ss} - D_K^{FF})/}{2} > d_{VI} + s_{gb}$$

In the three categories, $s_{th}$ is the threshold of timing slack to define the timing-critical paths (i.e., $s_{th}=10\%$ of clock period); and $s_{gb}$ is the slack guard band to evaluate tradeoff between delay impact of VI insertions versus timing improvement from mix-and-match stacking. The application of a guardband ensures that there is no timing violation due to partitioning, even if the VI delay estimation is optimistic. Here, for maximum-delay (path delay upper bound) constraints, "optimistic" means an underestimation of the delays; for minimum-delay (path delay lower-bound) constraints, "optimistic" means an overestimation of the delays.

The preferred optimization focuses on the two timing-critical paths (i.e., Type-II and Type-III paths). The optimization ensures that startpoint and endpoint of a Type-II path are assigned to the same tier. The optimization also maximizes the number of Type-III paths being cut, which serves to improve the potential timing benefits from mix-and-match die integration. To construct the sequential graph, each startpoint or endpoint (e.g., register, PI or PO) becomes one vertex, and a directed edge is inserted between two vertices if there exists a (combinational) timing path between the vertices when they are taken as startpoint and endpoint. This optimization only considers the maximum-delay path between any startpoint-endpoint pair. The algorithm in [M. X. Goemans and D. P. Williamson, "Improved Approximation Algorithms for Maximum Cut and Satisfiability Problems Using Semidefinite Programming", J. ACM 42(6) (1995), pp. 1115-1145] can be used for the maximum-cut optimization, in which the maximum-cut problem is relaxed to a semidefinite program (SDP). The SDP solution is then randomly rounded to achieve a partitioning solution. SDPA can be used [SDPA Official Page. http://sdpa.sourceforge.net/] as the semidefinite programming solver. Goemans et al. first propose a semidefinite relaxation for the maximum partitioning problem which is formulated as a quadratic programming problem. They then perform randomized rounding to achieve a partitioning solution.

Figure 3C:
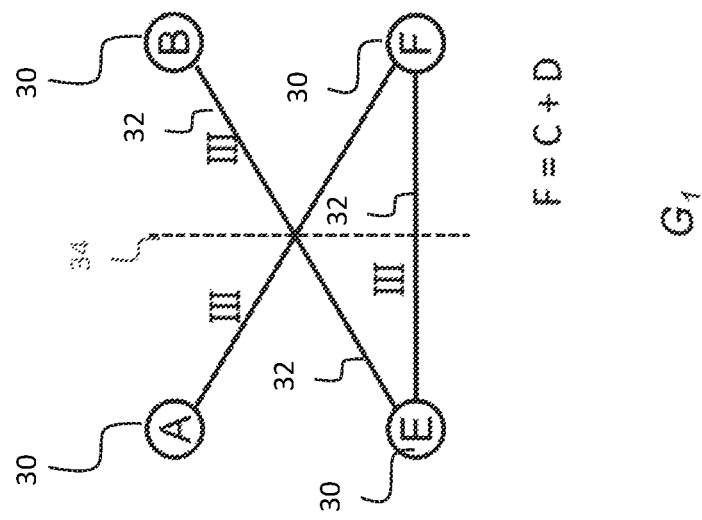
FIGS. 3A-3C illustrate application of preferred steps for partitioning a sequential graph in a heuristic embodiment of the invention.
Figure 3B:
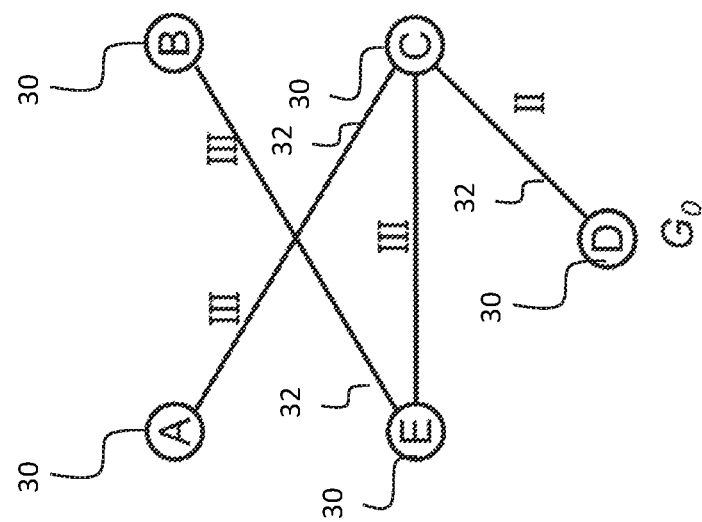
Figure 3A:
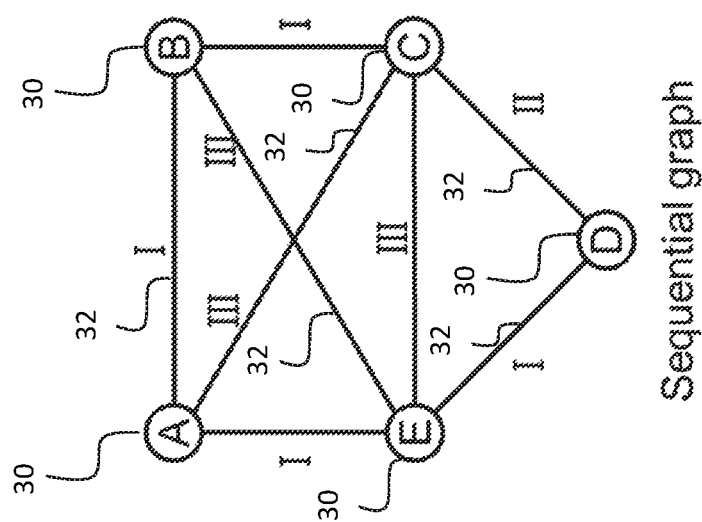

Steps for Partitioning of the Sequential Graph
Step 1 Extract restricted sequential graph $G_0$ that contains only Type-II and Type-III paths.
Step 2: Collapse vertices connected with Type-II paths (edges) into one vertex to obtain a new graph $G_1$.
Step 3: Perform maximum cut on $G_1$ Since Type-I paths have large positive timing slacks, the partitioning above does not require an additional constraint/priority for such paths. When vertices all collapsed into a super vertex, the corresponding instances are forced to be placed on the same die. F means a cluster of instances, which are originally represented by vertices C and D. FIGS. 3A-3C illustrates application of Steps 1-3 on an example sequential graph (FIG. 3A) that consists of five vertices 30 and eight edges (paths) 32. The edges 32 are labelled according to Types I, II, and III defined above. FIG. 3B shows the restricted sequential graph G_0 that contains only Type-II and Type-III paths. FIG. 3C shows the collapse of nodes C and D into a new node F, and also illustrates a maximum cut line 34.

The preferred method uses the maximum-cut partitioning solution of a timing critical sequential graph to fix the tier assignments of flip-flops and then performs timing-aware multi-phase partitioning to achieve the final partitioning solution. At each phase of optimization, preferred methods perform optimizations in parallel with multiple threads. Specifically, different optimization parameters (e.g., maximum size of a cluster) are used in different threads. Therefore, different threads perform optimization on the same input instance but with different partitioning solutions. The present optimization can be considered a "meta-heuristic"—try many variants of the optimization (where "variants" correspond to different parameter settings), and then simply take the best result over all the variants' runs. Optimization in each thread first clusters cells such that the size of the cluster is within a given range (i.e., $[N_{lb}, N_{ub}]$). Performing optimizations in parallel with multiple threads permits, for example, different optimization parameters (i.e., maximum size of a cluster) to be used in different threads. Therefore, different threads perform optimization on the same input instance but with different partitioning solutions. Based on the clustered netlist, each thread then performs the classic Fiduccia-Mattheyses (FM) optimization [C. M. Fiduccia and R. M. Mattheyses, "Linear Time Heuristic for Improving Network Partitions", Proc. DAC, 1982, pp. 175-181] to improve the partitioning solution in terms of the worst timing slack in the context of mix-and-match stacking. The range of cluster sizes is varied across different threads during the optimization. At the end of each phase, the partitioning solution with the maximum timing slack is selected as the input to the next phase. The FM optimization is an iterative, heuristic partitioning optimization. It iteratively improves the partitioning solutions by moving gate instances from one partition to another with maximized gain function value. So there is a prior partitioning solution and an improved partitioning solution for each iteration of optimization.

The present modified FM optimization defines the gain function u of a cluster as $$\text{gain}(u) = \frac{\Delta \text{slack}(u)}{\text{slack}(u) - WNS} \quad (10)$$

where slack(u) is the worst slack of cluster u; $\Delta$slack(u) is the slack change when moving u across tiers; and WNS is the worst negative slack of the entire design.

Figure 4:
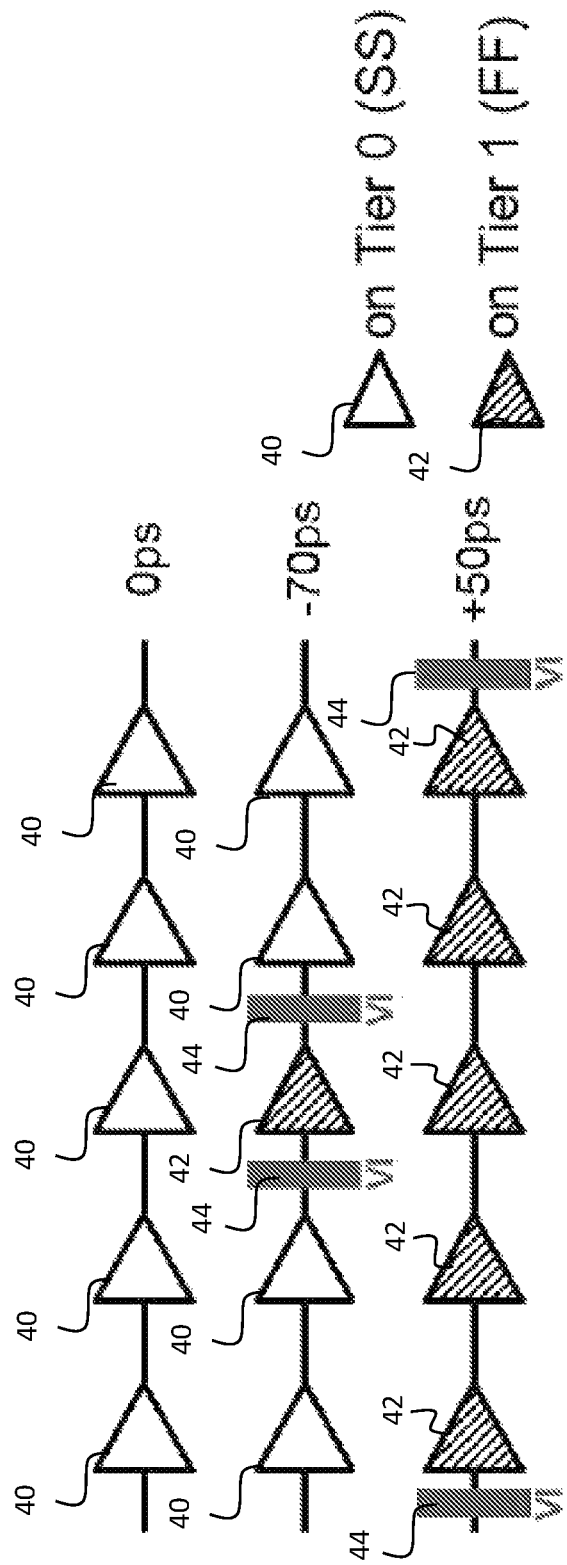
FIG. 4 illustrates an example of a preferred clustering method.

Clustering cells at each phase before the FM optimization not only reduces the runtime of FM optimization but more importantly also improves the solution quality. FIG. 4 shows an example in which moving one cell with negative gain can eventually lead to slack improvement after moving its neighbor cells. In the example, although moving one cell across tiers degrades the slack of the path due to VI insertions, moving its neighbor cells compensates for the delay impact of VI insertions and eventually improves the path timing for mix-and-match stacking. However, during the FM optimization, it is difficult and expensive (in terms of runtime) to "foresee" such slack benefits. In other words, to evaluate the gain function of one cell including its future impact, one must consider a large number of potential moves of its neighbor cells. The number of potential future move sequences can be large if only moving multiple stages of cells can compensate for the delay impact of VI insertions. To reduce the computational complexity, preferred embodiments cluster cells such that timing improvement from moving a cluster can compensate for the delay impact of VI insertions. Further, since the goal of clustering and partitioning is to balance cell delays across tiers along each timing path, the desired cluster size highly depends on number of stages along the paths, fanout number at each stage, and netlist topology. Given that the number of stages along the path is limited by timing constraints, along with the maximum fanout constraint, a too-large cluster size might not help to balance delays across tiers along a timing path. The number can be set empirically. The cluster size in experiments, for example was set to be no larger than 120, which was empirically set for 28FDSOI technology. The best cluster size is affected by technology, timing constraints, maximum fanout constraint as well as the connectivity of the design itself.

The example of FIG. 4 shows that the method can optimize a cell with a negative gain value. Assume that the difference between cell delays at SS and FF is 30 ps, delay impact due to VI insertion is 50 ps (picoseconds), and all cells 40 along the path (only a segment of five cells is shown) are initially on Tier 0. Also assume that a stacking of SS Tier 0+FF Tier 1 is applied. The initial path is at the top with zero slack. In the next step, one cell 42 being moved to Tier 1 degrades the slack by 70 ps due to VI insertions 44. However, in the third step, further optimization improves the slack by 50 ps. The optimization thus partitions cells between Tier 0 and Tier 1 (or Tile 0 and Tile 1 in a 2.5D IC).

Clustering Procedure

FIG. 5 shows pseudo code for a preferred clustering procedure. The procedure first sorts all cells in increasing order of their slacks (Line 1). Topological order is used to break ties. Next, select an unclustered cell from the ordered list as the starting point for clustering (Line 2). Based on the selected cell, evaluate its slack changes due to moves (i.e., tier re-assignment) on its neighbor cells. If slack improves, we add the corresponding neighbor cell into the cluster (i.e., u), and further consider moves on neighbor cells of the new added cell (Lines 7-11, 15). However, when no move with slack improvement is available, the procedure selects the neighbor cell corresponding to the move with the minimum slack degradation and adds it to the cluster (Lines 17-22, 27-30). The clustering procedure terminates when the cluster size meets the predetermined range (i.e., $[N_{lb}, N_{ub}]$) or there is no unclustered neighbor cell (Lines 12-14, 24-26). The predetermined range is determined empirically and is affected by the technology, timing constraints, maximum fanout constraint as well as the connectivity of the design itself. The ranges used in experiments are [100, 120], [80, 90], [60, 70], [40, 50], [20, 30] and [10, 20].

During the clustering, each cluster contains cells originally belonging to the same tier. Cells within a cluster must be on the same tier (or tile in a 2.5D IC layout). The slack of a cluster (i.e., slack(u)) is defined as the worst slack of cells within the cluster. Further, the estimation of slack ({c,u}) comprehends mix-and-match stacking (i.e., worst case over SS Tier 0+FF Tier 1 and FF Tier 0+SS Tier 1). The timing analysis takes into account the delay impact of VI insertions. Assuming that the incremental timing analysis is performed in constant time, the runtime complexity of our clustering algorithm is $0 (|C|^3)$. A preferred technique for the incremental timing analysis propagates slew and update cell delay through interpolation in Liberty lookup tables. Starting from the moved cell, we traverse the timing graph both forwards and backwards until there is no slack change. Given the maximum fanout constraints (e.g., 20) and limited number of stages to which "ripple effects" propagate (e.g., ~2-3 stages at most), in practice there is a constant bound on the number of cells updated during the incremental timing analysis.

Figure 7:
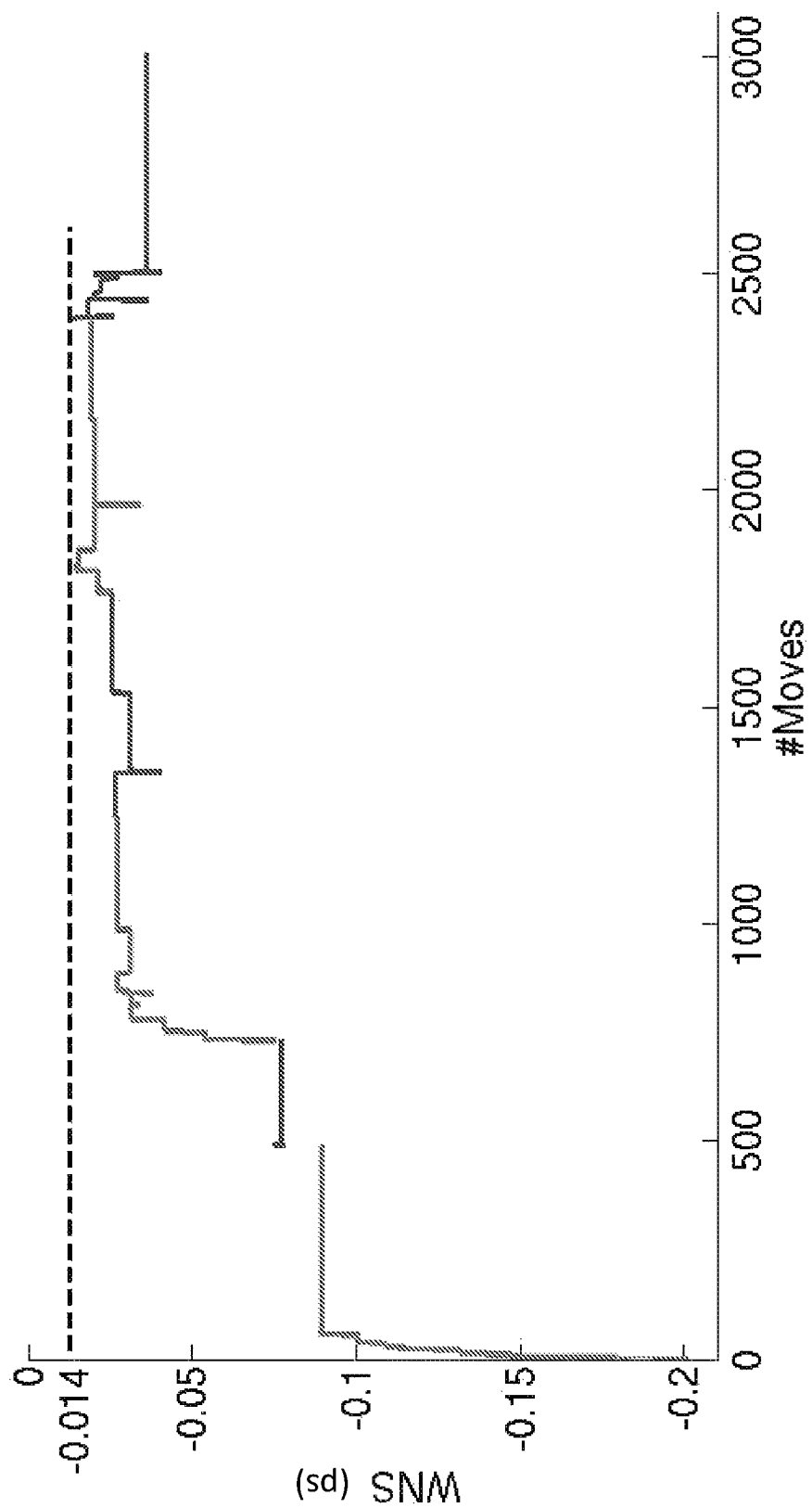
FIG. 7 illustrates the effectiveness compared to the number of tier moves for a preferred multi-phase optimization.

FIG. 6 illustrates an example of VI insertion/removal across tiers. A cell 60 that was on Tier 0 is moved to Tier 1 to be a Tier 1 cell 62, while a VI 64 is removed and two are added in the transformation from left to right in FIG. 6. In each run of FM optimization, the preferred method iteratively selects the cluster with the maximum gain value and move it across tiers. Clusters (cells) that have been moved are locked (prevented from being moved again). After each move, we perform incremental timing analysis and update the gain values of the neighboring clusters of which the worst slack is changed. An empirical observation from experiments is that the slack improvement at the later stages of an FM run is small (FIG. 7). Preferred methods therefore terminate after a certain number of clusters have been moved. A preferred termination percentage is that each FM iteration is terminated when 25% of clusters have been moved. A preferred range of termination percentage is when 10 to 30% have been moved, and a particularly preferred termination percentage is when 25% have been moved. Given that the initial partitioning solution is not area-balanced, in the first FM iteration we terminate the optimization when the area balancing. The data in FIG. 7 were obtained with an example of the present multi-phase FM optimization. Design: AES. Technology: 28FDSOI. Cluster size ranges were [60, 70], [30, 40] and [15, 20]. Each phase contains two runs of FM optimization shown as differently shaded curves. WNS (worst timing slack) improves from −200 ps to −14 ps. Runtime=565 seconds on a 2.5 GHz Intel Xeon server. If the WNS value is positive, the design can correctly operate under the given performance target (i.e., clock period); otherwise, if the WNS value is negative, there is timing violation.

With the above techniques, preferred methods conduct 3DIC implementation flow that is aware of mix-and-match die integration for implementing fabrication of three-dimensional integrated circuits. Methods for fabrication begin with partition a netlist into partitions comprehending mix-and-match die integration, with each partition being assigned to a die. Each partition is placed on the die. Clock tree synthesis of the 3DIC is conducted. Nets of the 3DIC are then routed.

In preferred methods the step of mix-and-match-aware partitioning includes selecting a set of instances (standard cell or macroblock in an IC layout). The selected instances are partitioned into multiple dies such that timing delays on timing critical paths are minimized under the context of mix-and-match die integration. The rest of the instances are then petitioned to balance area across dies. The selecting instances of instances can be based on timing delays on timing critical paths that are reduced by mix-and-match die integration. The step of partitioning selected instances can minimize timing delays on timing critical path.

In preferred methods the step of mix-and-match-aware partitioning includes stacking multiple packaged dies such that a plurality of the packaged dies has been selected for packaging based on criteria that omit at least one combination of measurements that are indicators of die timing performance. What measurements to be omitted depends on the objective function. For example, to improve the parametric yield, we can omit integration of two slow (e.g., SS=slow nMOS and slow pMOS) dies. However, in the present mix-and-match context, particular combinations can be ignored to improve design quality (i.e., reduce power and area penalties due to pessimistic signoff assumptions). All the timing optimization steps and especially the signoff stage can avoid the omitted measurements. Each die's timing performance can be measured prior to integration. At least the packaged dies in an omitted combination of measurements can be the packaged dies that are worse than typical die timing performance, or can be the packaged dies that are better than typical die timing performance. To omit integration of two worse-than-typical dies, the setup timing signoff constraints can be relaxed to reduce power and area or to improve maximum performance. To omit integration of two better-than-typical dies, the hold timing signoff constraints to reduce power and area can be relaxed.

Partitioning steps that evaluate timing constraints will be affected by this. The point here is that SS-SS could be omitted (when checking for slow paths=maximum delay (upper bound) constraint), AND/OR FF-FF could be omitted (when checking for fast paths)=minimum delay (lower bound) constraint).

Design databases of multiple dies can be signed off with a timing signoff specification for multiple dies. The timing signoff specification for multiple dies can omit at least one signoff combination of a plurality of single-die corners that are each otherwise incorporated into at least one other signoff combination of single-die corners, in a manner corresponding to a mix-and-match die integration. This indicates the signoff criteria of a multi-die package must comprehend different combinations of signoff corners for dies in the 3D IC or 2.5 IC design.

At least one single-die corner in an omitted signoff combination can be a process corner that has faster than typical transistor speed, or a process corner that has slower than typical transistor speed.

The mix-and-match die integration can include stacking or tiling multiple packaged dies such that a plurality of the packaged dies has been selected for packaging based on criteria that omit at least one combination of measurements that are indicators of die leakage power. Each die's leakage power can be measured prior to integration. The packaged dies in an omitted combination of measurements is the packaged dies can be less than typical die leakage power, or can be in an omitted combination of measurements is the packaged dies that are greater than typical die leakage power. The example formulation/experiments focus on maximization of performance. However, power constraints can be applied by adding constraints in ILP formulation and FM-based partitioning, to reach other performance goals.

The design databases of multiple dies can be those that have been signed off with a power validation specification for multiple dies. The power validation specification for multiple dies can be one which omits at least one analysis combination of a plurality of single-die corners that are each otherwise incorporated into at least one other signoff combination of single-die corners, in a manner corresponding to a mix-and-match die integration. The at least one single-die corner in an omitted signoff combination can be a process corner that has less than typical transistor leakage current, or can be a process corner that has greater than typical transistor leakage current. One can assume that the number of less-than-typical dies and greater-than-typical dies are similar according to the distribution of process variation. Therefore, by not integrating all less-than-typical or all greater-than-typical dies in a multi-die design, i.e., by using mix-and-match integration, preferred methods can improve the parametric yield of multi-die integrations.

Example 3D integrations can include die-to-die, die-to-wafer, and wafer-to-wafer stacking based on through silicon vias as well as monolithic 3D integration, or any technique where interconnect techniques for 3D integration are used to generate vertical interconnect.

The partitioning can minimize area, leakage power, and delay penalties from vertical interconnects. The partitioning can ensure the timing benefits from mix-and-match stacking always outweighs the delay penalty from vertical interconnects. The vertical interconnect on timing-critical paths can be conducted without tolerance of vertical interconnect insertion. The partitioning step can maximize the number of timing endpoint pairs partitioned into different dies. The partitioning can ensure area balancing across dies and each die's total cell area is within a defined range. By avoiding cuts on Type-II paths, and more than one cuts on Type-III paths (i.e., partitioning of sequential graph step), the optimization ensures that slack benefits outweigh delay penalty from vertical interconnect. By performing maximum cut on Type-III paths, the optimization maximizes the number of timing endpoint pairs partitioned into different tiers. Our FM-based partitioning and area balancing/timing constraints in ILP ensures that area of each tier is balanced and timing constraints are met.

Experiments

Experiments validated the methods of the invention. The present partitioning methods were implement in C++ to form a design optimizer. CPLEX v12.5 [IBM ILOG CPLEX. www.ilog.com/products/cplex/] was used as an ILP solver and SDPA [SDPA Official Page. http://sdpa.source-forge.net/] as a semidefinite programming solver. The SP&R (synthesis, placement and routing) flow used Synopsys Design Compiler H-2013.03-SP3 [Synopsys Design Compiler User Guide. http://www.synopsys.com], Cadence Encounter Digital Implementation System XL 12.0 [Cadence SOC Encounter User Guide. http://www.cadence-.com], Synopsys PrimeTime H-2013.06-SP2 [Synopsys PrimeTime User Guide. http://www.synopsys.com] for logic synthesis, P&R, and timing/power analyses, respectively. The invention was used to modify six open source benchmarks/testcases (DMA (direct memory access interface), USB (universal serial bus), AES (advanced encryption standard), MPEG (video encoder), JPEG (image encoder), VGA (video graphics array)) [OpenCores: Open Source IP-Cores. http://www.opencores.org] and an ARM Cortex M0 in our experiments. These testcases were generated with foundry 28 nm FDSOI 12-track, dual-VT libraries. We used a BEOL stack of six metal layers for routing.

TESTCASES USED IN THE EXPERIMENTS.

| Design | #Instances | Clock period (ns) |
|---|---|---|
| DMA | 2K | 0.6 |
| USB | 4K | 0.8 |
| ARM Cortex M0 | 9K | 1.2 |
| AES | 11K | 1.1 |
| MPEG | 13K | 1.2 |
| JPEG | 36K | 1.4 |
| VGA | 73K | 1.0 |

Three experiments were conducted to evaluate the performance of our partitioning methodologies. (i) The solution quality of our heuristic partitioning optimization was validated by comparing its solutions with those of the ILP-based method. The ILPbased method was performed on two small testcases (DMA and USB) to avoid scaling complications. (ii) The heuristic partitioning method was validated on a brute-force 3DIC implementation flow, and (iii) on a state-of-the art 3DIC implementation flow [S. Panth, K. Samadi, Y. Du and S. K. Lim, "Design and CAD Methodologies for Low Power Gate-level Monolithic 3D ICs", Proc. ISLPED, 2014, pp. 171-176]. In the experiments, we performed three-phase optimization; each phase contains two FM runs. The ranges we use for cluster sizes were [100, 120], [80, 90], [60, 70], [40, 50], [20, 30], [10, 20]. Thus, the optimization used six threads.

3DIC Implementation Flows

Based on the conventional 2D implementation (P&R) flow, we study a brute-force 3DIC implementation as shown in the table of pseudo code below. First partition the netlist into two tiers (Line 1). After the partitioning, place cells on Tier 0, and determine the VI locations based on that placement (Lines 2-3). With the fixed VI locations, perform placement optimization on Tier 0 and Tier 1 separately (Line 4). Then insert a VI as the clock port on Tier 1. The clock VI location on Tier 1 is close to the clock port location on Tier 0 to minimize the cross-tier clock skew. Clock tree synthesis is performed on Tier 0 and Tier 1 separately (Lines 6-7). Last, perform routing and routing optimization on each tier (Line 9). A 3D timing analysis and update timing constraints is performed for each tier after placement and CTS (clock tree synthesis).

---
Brute-force 3DIC implementation flow.

---
1: Netlist partitioning (our partitioning method);
2: Initial placement on Tier 0;
3: VI insertion based on placement of Tier 0;
4: Placement optimization on Tier 0 and Tier 1;
5: Timing constraint update;
6: VI insertion for clock port on Tier 1;
7: Clock tree synthesis (CTS) on Tier 0 and Tier 1;
8: Timing constraints update;
9: Routing and routing optimization on Tier 0 and Tier 1;

---

We also use the advanced 3DIC implementation flow in [S. Panth, K. Samadi, Y. Du and S. K. Lim, "Design and CAD Methodologies for Low Power Gate-level Monolithic 3D ICs", Proc. ISLPED, 2014, pp. 171-176] to validate the present partitioning method. The flow first performs 2D implementation with scaled (i.e., 0.7×) cell sizes and floorplan. Based on the shrunk 2D implementation, it partitions cells into two tiers. It further modifies the technology files so that BEOL stacks of two tiers (each has six layers) are connected as one (12-layer) BEOL stack and performs routing on both tiers to determine VI locations. Last, it performs routing and routing optimization on each tier separately. In the flow, all the clock cells are forced to be on Tier 0. Since the flow is based on a shrunk 2D implementation, we refer to the flow as shrunk 2D flow in the following discussion of results.

To be aware of mix-and-match die integration, we extend both flows to perform a multi-view optimization after the netlist is partitioned, such that the die stacking of {SS Tier 0+FF Tier 1, FF Tier 0+SS Tier 1} is captured during the P&R optimization. In addition, we assume face-to-face (F2F) die stacking in both flows. maximize the timing benefit from mix-and-match die stacking, large number of VIs will be inserted. On the other hand, VI insertions will have area impact in a face-to-back stacking-based implementation. We therefore assume F2F stacking. We also note that F2F stacking is more preferable in the regime of mix-and-match die integration.

Experimental Results

Calibration of Heuristic Partitioning.

Figure 8:
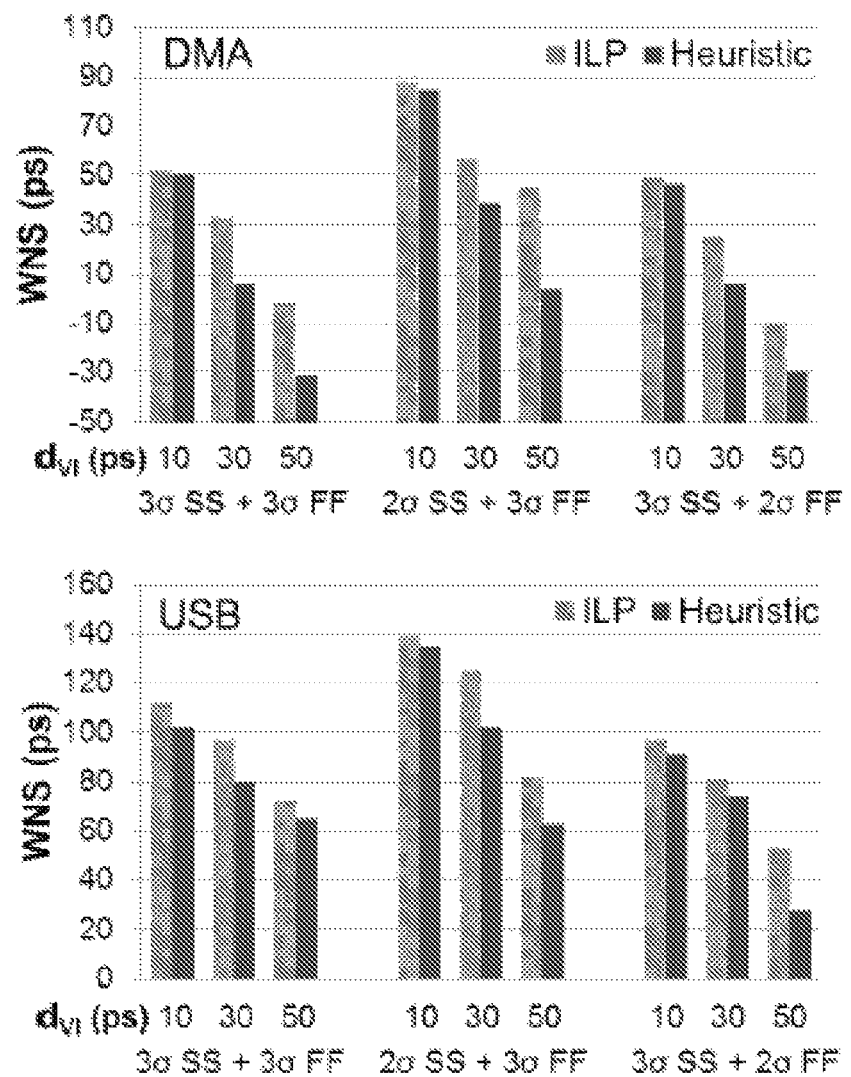
FIG. 8 compares solution qualities of an ILP method and a heuristic method.

We calibrate our heuristic partitioning method by comparing its solutions to those of the ILPbased method. We perform experiments on designs DMA and USB. We vary the VI insertion delay impact from 10 ps to 50 ps. We also assume different combinations of process conditions (i.e., {3σ SS+3 σ FF, 2 σ SS+3 σ FF, 3 σ SS+2 σ FF}). Comparison results in FIG. 8 show that except for one outlier, the timing slack resulted from our heuristic method is always within 30 ps difference compared to the solution of the ILP-based method, where the ILP-based solution is considered to be very close to the optimal solution. This confirms that our heuristic method is able to comprehend asymmetric distribution of process bins and VI delay impact. The outlier occurs with the setup of large VI delay impact, where the problem becomes more challenging.

Validation of Present Heuristic Partitioning Method on Brute-Force Flow.

The table in FIG. 9 shows the timing quality, total cell area, power, gate count, wirelength, number of VIs and post-routing utilization of implementations using the brute-force flow and the brute-force flow with our heuristic partitioning method. Note that the reported timing and power are the worst cases between SS Tier 0+FF Tier 1 and FF Tier 0+SS Tier 1. We observe that our partitioning approach leads to up to 16% timing improvement (i.e., on designs AES and VGA) compared to the bruteforce flow, which uses conventional min-cut partitioning [A. E. Caldwell, A. B. Kahng and I. L. Markov, "Improved Algorithms for Hypergraph Bipartitioning", Proc. ASP-DAC, 2000, pp. 661-666], while achieving similar area and power. The larger wirelength is because of additional wires routed to the increased number of Vis.

Validation of Our Method on Shrunk2D Flow.

Table III shows design metrics of implementations using the original shrunk2D flow and its extension with our partitioning method. We observe that the extended flow with our partitioning approach achieves up to 7% timing improvement (i.e., on design ARM Cortex M0) with similar area, power and wirelength. Note that to maintain the solution of the 2D implementation in the scaled floorplan, we include additional bin-based area balancing constraints such that we uniformly divide the core area into N×N bins and set area balancing criteria for each bin during the FM optimization. We use three bin sizes in our optimizations— 20 μm×20 μm, 30 μm×30 μm and 50 μm×50 μm—and report the result with the maximum timing slack in the table of FIG. 9. The results show that our optimization leads to up to 16% timing improvement, as compared to a flow with min-cut based partitioning solution, when measured by RC extraction and signoff timing at the postrouting stage.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A method for optimizing a multi die implementation flow that in view of a mix-and-match die integration context for implementing a multi-die integrated circuit, the method comprising the steps of:
    partitioning a netlist of the mix-and-match die integration context into partitions using a priori process information of speed classifications of individual dies in the die integrations, wherein each partition will be assigned to a die;
    placing each partition on a corresponding die;
    synthesizing a clock tree of the integrated circuit; and
    routing nets of the integrated circuit in accordance with said placing and synthesizing.

2. The method of claim 1, wherein said partitioning comprises:
    selecting a set of instances;
    conducting a 3D timing analysis to determine any timing delays;
    partitioning the selected instances into multiple dies such that timing delays on timing critical paths are minimized under the mix-and-match die integration context; and
    partitioning remaining instances to balance area across dies.

3. The method of claim 1, wherein the mix-and-match die integration comprises selecting multiple packaged dies on criteria that omit a selected combination of indicators of die timing performance.

4. The method of claim 3, wherein the selected combination of indicators comprises pessimistic signoff assumptions.

5. The method of claim 3, wherein selected combination of indicators comprises a group of worse-than-typical dies determined by relaxing setup timing signoff constraints to reduce power and area or to improve maximum performance.

6. The method of claim 3, wherein the selected combination of indicators comprises two better-than-typical dies determined by setting hold timing signoff constraints to be relaxed to reduce power and area.

7. The method of claim 1, wherein said partitioning ensures that the multi-die integrated circuit will have slack benefits that outweigh delay penalties from vertical interconnects between dies.

8. The method of claim 1, wherein said partitioning ensures that area of each die of the multi-die integrated circuit is balanced and timing constraints of the multi-die integrated circuit are met.

9. The of claim 1, wherein said partitioning comprises partitioning the netlist into two dies by determining a worst timing slack from possible corner combinations that can be formed by mix-and-match stacking, and maximizing the worst timing slack in view of an objective that minimizes maximum path delay over all timing paths across process corners that affect delays of downstream cells.

10. The method of claim 1:
wherein the netlist comprises a timing critical sequential graph that is a partial sequential graph containing only startpoints and endpoints of timing-critical paths;
wherein said partitioning comprises partitioning via a global optimization that performs a maximum cut on the timing-critical sequential graph and performing incremental optimization performs timing-aware multiphase FM optimization to achieve to achieve final partitioning solution in the context of the mix-and-match die integration based upon constraints applied by the mix-and match die integration.

11. The method of claim 1, wherein said partitioning comprises partitioning by:

classifying paths in the netlist into timing non-critical paths (Type I), timing critical paths without tolerance of VI insertions (Type II), and timing critical paths with tolerance of VI insertion (Type III); and
optimizing through die assignments that ensure that the start point and end point of timing critical paths without tolerance of VI insertion are assigned to the same die and maximizes the number of timing critical paths with tolerance that are being cut.

12. The method of claim 11, wherein said optimizing comprises:
extracting a restricted sequential graph $G_0$ that contains only Type-II and Type-III paths;
collapsing vertices connected with Type-II paths (edges) into one vertex to obtain a new graph $G_1$; and
performing a maximum cut on the new graph $G_1$.

13. The method of claim 12, wherein said optimizing comprises performing optimizations in parallel with multiple threads.

14. The method of claim 11, further comprising clustering cells prior to performing said optimizing.

15. The method of claim 14, wherein said clustering comprises:
determining slacks of all cells;
sorting all cells in increasing order of their slacks, while using topological order to break ties;
selecting an unclustered cell from the ordered list as the starting point for clustering;
evaluating slack changes of the selected unclustered cell due to moves on its neighbor cells;
if slack improves, adding a corresponding neighbor cell into the cluster and evaluating further moves on neighbor cells of the added corresponding neighbor cell
if no move with slack improvement is available, selecting the neighbor cell corresponding to a move with minimum slack degradation and adding it to a cluster;
continuing said selecting and evaluating until a termination determined when the cluster size meets a predetermined range or there is no unclustered neighbor cell.

16. The method of claim 15, wherein said clustering comprises clustering such that each cluster contains cells originally belonging to the same die.

* * * * *